July 11, 1950 — R. B. STEWART — 2,514,907
FLOW MEASURING DEVICE
Filed June 13, 1945
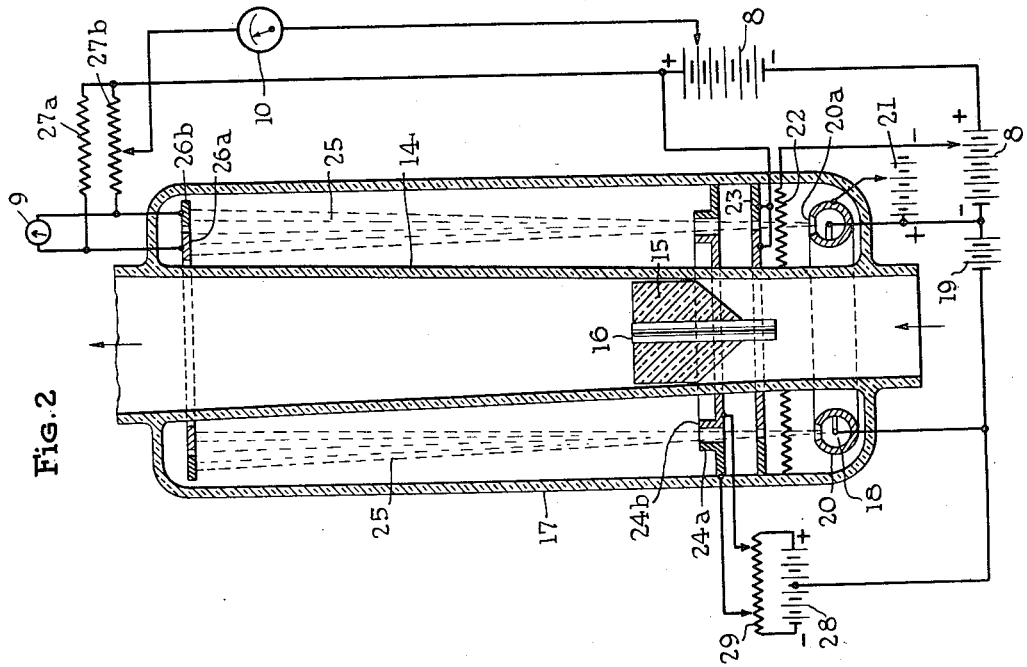
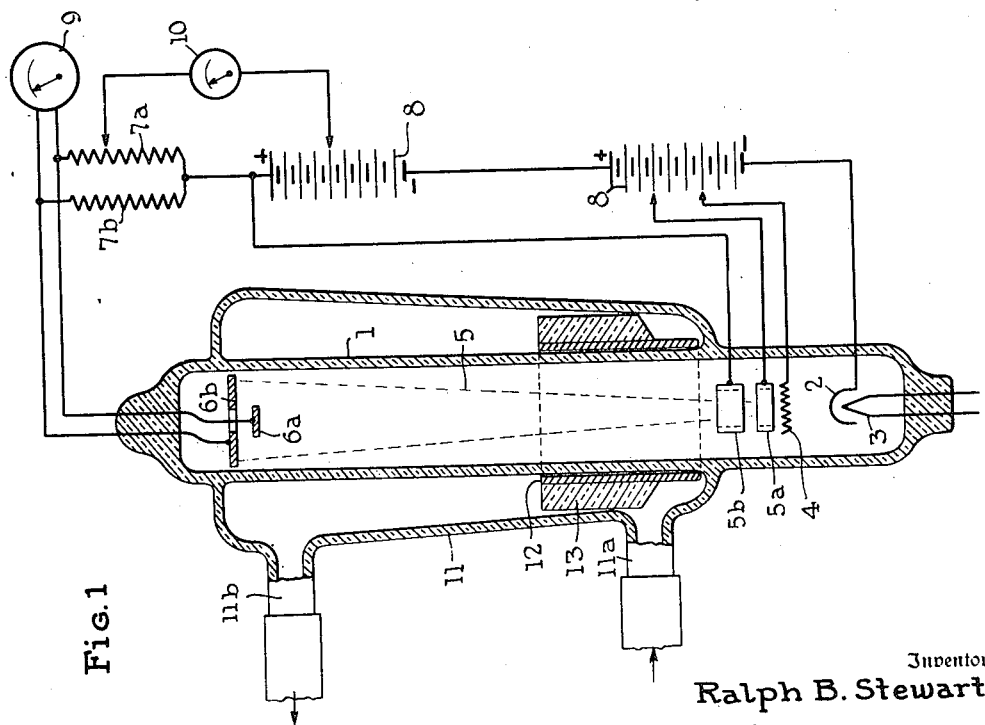
Inventor
Ralph B. Stewart
By J. D. Stewart
Attorney Patented July 11, 1950

2,514,907

UNITED STATES PATENT OFFICE 2,514,907

FLOW MEASURING DEVICE

Ralph B. Stewart, Chevy Chase, Md., assignor to Askania Regulator Company, a corporation of Illinois Application June 13, 1945, Serial No. 599,133

9 Claims. (Cl. 73—209)

This invention relates to devices for the measurement of the rate of flow of fluids.

An object of the invention is to devise a flow measuring device embodying an electron beam tube, and also embodying a movable element which responds to the rate of flow and serves to expand or contract the electron beam of the tube, together with means to indicate the change in concentration of the beam.

A more general object of the invention is to devise electronic apparatus for translating the mechanical movement of an element into variations in the concentration of an electron beam, translating the beam variations into corresponding current variations, and translating the current variations into an indication bearing a definite relation to the movement of the control element.

Two forms of my invention are illustrated in the accompanying drawing in which:

Figure 1 is a longitudinal sectional view showing one form of the invention in which the electron beam is established within a central space of the device, while the movable magnet responsive to the rate of flow is located in an annular space surrounding the electron tube; and Figure 2 is a longitudinal sectional view of a modification in which the movable magnet is located in a central space of the device, while the electron beam is established within an outer annular space.

Referring to the drawing, 1 indicates the envelope of an electron beam tube (a cathode ray tube) having an electron-emitting cathode 2 heated by a suitable heater element 3 positioned in one end of the tube. Electrons are drawn from the cathode 2 by accelerating grid 4 and are focused into an electron beam 5 by accelerating and focusing electrodes 5a and 5b. In the upper end of the tube 1 is located a pair of target anodes 6a and 6b. These two target anodes are arranged in concentric relation with the smaller anode 6a arranged in front of the anode 6b. It will be understood that anode 6a could be positioned within the central opening of anode 6b.

Target anodes 6a and 6b are connected through coupling resistances 7a and 7b to the positive terminal of a source of current represented by the battery 8, and the negative terminal of this source is connected to the cathode 2. The tube electrodes 4, 5a and 5b are connected to suitable points on the battery 8 as will be understood by those skilled in the electronic art. A suitable voltmeter or other voltage operated meter 9 is connected across the leads of anodes 6a and 6b or, alternatively, a voltmeter 10 may be connected across a portion of one of the resistances 7a or 7b and a portion of the battery 8.

A jacket 11 is formed around the tube envelope 1 along the portion containing the electron beam. The inner wall of this jacket is tapered from a given diameter at the bottom to a larger diameter at the top. This jacket is provided with an inlet connection 11a at the bottom and an outlet connection 11b at the top by which the fluid to be measured is caused to pass through the annular jacketed space surrounding the electron tube. A magnet in the form of a metallic sleeve 12 surrounds the tube envelope 1 within the jacket 11 and is free to move to various positions within the jacket. A plug 13 is mounted on and carried by the magnet 12, and this plug is formed so that it substantially closes the annular space at the bottom of the jacket 11 when the magnet and plug assembly is located in its lowermost position. As the plug assembly rises, the annular space between the plug and the inner wall of the jacket 11 becomes increasingly greater. The plug assembly including the magnet 12 is sufficiently heavy so that it will not float in the liquid or fluid which fills the jacket 11, and the plug will remain in its lowermost position if the fluid is not moving within the jacket. If, however, the liquid or fluid begins to flow through the jacket, the force of the liquid causes the plug to rise until the annular space between the plug and the jacket 11 is sufficiently large to permit the fluid to pass around the plug, and the elevation of the plug at any given time will be determined by the rate of flow of the liquid through the jacket.

The operation of Figure 1 is as follows: Assuming that there is no flow of liquid through the jacket 11 and the magnet 12 is in its lowermost position, the potentials on the electrodes 4, 5a and 5b are adjusted until the meter 9 reads zero. This indicates a condition of equal electron interception by target anodes 6a and 6b, assuming equal values of resistances 7a and 7b. If now fluid begins to flow through jacket 11 and magnet 12 moves upwardly, the magnetic field of magnet 12 will vary the concentration of the beam 5 and thereby vary the distribution of electrons reaching the two target anodes, and this will result in the development of a potential difference between the two anode leads which will be indicated by the meter 9. The amount of potential difference developed across the anode leads will vary with the position of the magnet 12 and this potential difference will bear a definite relation to the rate of flow of the liquid through the jacket.

Where meter 10 is used for indicating the rate of flow, it is not necessary that the two anodes receive the same number of electrons, but the connection of the meter to the coupling resistance, or to the battery, is adjusted so that with the magnet 12 in its lowermost position the meter 10 reads zero. The connections are adjusted so that the potential drop across the lower part of resistance 7a is balanced by the portion of the battery 8 connected in series with the meter 10. Any movement of the magnet 12 upwardly will disturb the electron distribution and will cause an indication on the meter 10. It will be understood that when using a connection like that for meter 10, only one target anode corresponding to anode 6a is required.

Meter 9, or meter 10, may be located at a point remote from the jacketed electron tube, and these meters may be calibrated to indicate the rate of flow in appropriate units. Both meters 9 and 10 may be used simultaneously but in different locations.

The form of the flow measuring device illustrated in Figure 2 involves a reversal of elements from that shown in Figure 1 in that the fluid to be measured flows through the central tube, while the electron beam is established in the jacketed space surrounding the central tube. In this arrangement, the fluid to be measured enters the tapered tube 14 at the lower end, which is the small end, and passes out through the upper end. A suitable plug 15 is mounted within the tube 14 and carries a magnet 16 at the center thereof, the plug 15 serving to close the tube 14 when there is no flow of fluid through the tube. If fluid begins to flow through the tube, the plug 15 will rise to different positions within the tube depending upon the rate of flow of the fluid. Except for the provision of the magnet 16, this construction is substantially the same as that disclosed in the patent to Fischer et al. 2,130,981 and is commonly known as a "Rotameter."

An insulating jacket 17 surrounds the tapered portion of the tube 14, and an electron beam having an annular cross-section is established within the jacketed space surrounding the tube 14. Various arrangements for producing the electron beam are possible, but one suitable arrangement is shown in Figure 2 and involves an annular filament 18 heated by a battery 19, the filament 18 being positioned within a shielding ring 20 having an annular slot 20a formed in the upper side thereof through which electrons emerge from the filament 18. The shielding ring 20 may be maintained at a suitable negative potential with respect to the filament 18 by means of a current source 21. An annular accelerating grid 22 is positioned above the ring 20 and is maintained at a positive potential by the battery 8. An accelerating anode 23 having an annular slot formed therein is positioned above the grid 22 and allows an electron beam of annular cross-section to pass through the slot. Positioned above the anode 23 is a pair of annular focusing electrodes 24a and 24b. These electrodes are arranged in concentric relation to provide an annular space through which the electron beam passes from the anode 23. The annular electron beam represented by the dotted lines 25 is projected upwardly against a pair of concentric target anodes 26a and 26b which are connected to the positive terminal of source 8 through coupling resistances 27a and 27b respectively. Meters 9 and 10 are connected in the same manner as in Figure 1.

The distribution of electrons received by the two target anodes 26a and 26b is normally controlled or adjusted by adjusting the potentials applied to the annular electrodes 24a and 24b. These potentials may be applied from battery 8 through separate connections, or they may be applied from a separate source represented by the battery 28 and the potentiometer 29 with connections from separate sliders on the potentiometer leading to the electrodes 24a and 24b, whereby voltages of different polarities and different magnitudes may be applied to the electrodes.

Operation of Figure 2 is as follows: With no flow of fluid through the tube 14 and the plug 15 located in its lowermost position, the potentials applied to electrodes 24a and 24b are adjusted until the reading on meter 9 is zero. Upon flow of fluid through the tube 14, the plug 15 will rise and carry with it the magnet 16, and movement of the magnetic field of the magnet 16 will disturb the distribution of the electrons received by the two target anodes and will produce an indication on the meter 9.

From the foregoing it will be seen that in both forms of my invention the axis of the electron beam remains unchanged but the movable magnet expands or contracts the beam radially of its axis and thereby varies the relative amounts of electrons received by the two target anodes. It will also be noted that the magnetic field produced by the magnet in each case is symmetrical with respect to the axis of the central space of the device, that is, the magnetic field is toroidal in shape, and the axis of the electron beam coincides with the axis of the magnetic field.

The electronic apparatus embodied in my invention is useful for indicating the extent of movement of any element arranged to move the beam focusing means, and the focusing field may be produced by either a permanent magnet or an electromagnet.

While I have shown various electrode arrangements for producing the electron beams in the two measuring devices illustrated herein, it will be understood that other arrangements for producing the beams are possible, and my invention is not limited to the specific arrangements described herein.

I claim:

1. In a flow measuring device, the combination of a vertical tube providing a central space within said device, a jacket surrounding said tube and providing an annular space surrounding said central space, one of said spaces being tapered from a given size at the bottom of said space to a larger size at the top thereof, connections for passing fluid through said tapered space from the bottom to the top thereof, a vertically movable plug positioned within said tapered space and adapted to be moved to different elevations depending upon the rate of flow of fluid through said space, a magnet carried by said plug and establishing a magnetic field which is symmetrical with respect to the axis of said central tube, and means located within the other space of said device for establishing an electron beam coaxially with the axis of said magnetic field, whereby vertical movement of said magnet causes contraction or expansion of said electron beam radially of the axis of said beam.

2. A flow measuring device according to claim 1 wherein the electron beam is established in the center space formed within said vertical tube, and the fluid to be measured is supplied to the tapered annular space surrounding said tube.

3. A flow measuring device according to claim 1 wherein said vertical tube is tapered and the fluid to be measured is passed through said tube which is tapered, and said electron beam is formed within the annular space enclosed within said jacket and surrounding said tube.

4. A flow measuring device according to claim 1 and including a target anode for receiving a portion of the electrons from said beam, and means for indicating a change in the number of electrons received by said target anode.

5. A flow measuring device according to claim 1 and including a pair of concentric target anodes positioned in said device so that each anode intercepts a portion of the electrons of said beam, circuit connections from each anode to the source of electrons including a source of current and a coupling impedance in each connection, and means for indicating the potential difference between said anodes.

6. In a flow measuring device, the combination of a vertical tube providing a central space within said device, a cathode located in one end of said tube and a target anode located in the other end thereof, means for establishing an electron beam between said cathode and anode, a jacket surrounding said tube and providing an annular space surrounding said central space, connections for passing fluid through said annular space from the bottom to the top thereof, an annular magnet surrounding said tube and positioned within said annular space, flow responsive means for moving said magnet vertically within said annular space, and means connected with said anode for indicating variations in concentration of said electron beam.

7. In a flow measuring device, the combination of a vertical tube providing a central space within said device and forming a conduit through which fluid is passed through said device, a jacket surrounding said tube and providing an annular space surrounding said tube, an annular cathode mounted in one end of said annular space, a pair of concentric anodes mounted in the other end of said annular space, means for forming an annular electron beam between said cathode and said pair of anodes, a connection from each anode to a source of anode current including an impedance element, a voltage responsive device connected across said anodes, a magnet positioned within said vertical tube and forming a magnetic field symmetrical with respect to the axis of said tube, and flow responsive means for moving said magnet vertically within said tube.

8. In combination, an electron beam tube having an insulating envelope enclosing an elongated annular space, said envelope having an open space through the center thereof, means including an annular cathode for establishing an annular electron beam in said annular space, an annular anode positioned within said annular space for receiving a portion of the electrons from said beam, a connection from said anode to said cathode including a source of current, and means for varying the current in said connection comprising a magnetic field producing element mounted for movement in said central space and producing a magnetic field which is symmetrical with respect to the axis of said beam.

9. In combination, an electron beam tube including means for establishing along a given axis an electron beam of predetermined concentration, an anode positioned within said tube so that its electron intercepting surface is located within the cross sectional area of said electron beam and intercepts a variable portion of the electrons from said beam as the cross sectional area of the beam increases and decreases from said predetermined concentration with changes in concentration of the beam, a connection from said anode to the source of electrons including a source of current, means to vary the current in said connection comprising an annular member surrounding said tube and producing a toroidal magnetic field having its axis coincident with the axis of said beam, said annular member being movable along the length of said tube, and signal means for producing signal movements of said magnetic means along said axis whereby the concentration of said beam is varied to vary the proportional part of said electrons that is intercepted by said anode.

RALPH B. STEWART.

REFERENCES CITED

The following references are of record in the file of this patent:

UNITED STATES PATENTS

| Number | Name | Date |
| --- | --- | --- |
| 1,903,713 | Baule | Apr. 11, 1933 |
| 2,102,421 | Kuehni | July 12, 1934 |
| 2,333,884 | Porter | Aug. 30, 1941 |
| 2,358,902 | Ziebolz | Mar. 13, 1943 |
| 2,383,758 | Ziebolz | Sept. 23, 1943 |
| 2,414,086 | Brewer | Jan. 14, 1947 |
| 2,416,687 | Fry | Mar. 4, 1947 |
| 2,418,487 | Sproul | Apr. 8, 1947 |
| 2,442,975 | Grundmann | June 8, 1948 |